(12) United States Patent
Kim et al.

(10) Patent No.: US 6,836,788 B2
(45) Date of Patent: Dec. 28, 2004

(54) METHOD FOR SELECTING RTP ELEMENT IN DYNAMIC MULTICAST TREE FOR MULTIMEDIA CONFERENCE

(75) Inventors: Sang-Gil Kim, Seoul (KR); Sang-Hack Han, Kyoungki-Do (KR); Gyu-Tae Baek, Seoul (KR); Sang-Hong Lee, Kyoungki-Do (KR)

(73) Assignee: Korea Telecom (KR)

( * ) Notice: Subject to any disclaimer, the term of this patent is extended or adjusted under 35 U.S.C. 154(b) by 775 days.

(21) Appl. No.: 09/738,717

(22) Filed: Dec. 15, 2000

(65) Prior Publication Data

US 2002/0065886 A1 May 30, 2002

(30) Foreign Application Priority Data

Nov. 28, 2000 (KR) ........................................ 2000-71325

(51) Int. Cl.[7] .............................................. G06F 15/16
(52) U.S. Cl. ........................ 709/204; 709/203; 709/205; 709/231; 709/238; 709/239; 718/100; 718/105
(58) Field of Search ................................ 709/203, 204, 709/205, 231; 718/100, 105; 209/238–239

(56) References Cited

U.S. PATENT DOCUMENTS

| | | | | |
|---|---|---|---|---|
| 6,502,140 B1 | * | 12/2002 | Boivie | ........................ 709/238 |
| 6,601,082 B1 | * | 7/2003 | Durham et al. | ............. 718/100 |
| 6,678,250 B1 | * | 1/2004 | Grabelsky et al. | .......... 370/241 |

* cited by examiner

*Primary Examiner*—Jack B. Harvey
*Assistant Examiner*—Hieu Le
(74) *Attorney, Agent, or Firm*—Blakely Sokoloff Taylor & Zafman

(57) ABSTRACT

The invention relates to a method of selecting a RTP (Real Time Protocol) element in a dynamic multicast tree for a multimedia conference and a record medium recorded with a program for realizing the method that can be read by computers, and in particular to a method of selecting a RTP element in a dynamic multicast tree for distributing an overload applied to the root node of the dynamic multicast tree and a record medium recorded with a program for realizing the method that can be read by computers. The method comprises the steps of: (a) confirming in the RTP element if the RTP element is subscribed to the dynamic multicast tree that a new multimedia terminal wants to join; (b) if the RTP element is not subscribed to the dynamic multicast that the new multimedia terminal wants to join according to a result of the confirmation in the step (a), joining in the RTP element the root node of the dynamic multicast tree and then causing the new multimedia terminal to join the dynamic multicast tree of a multimedia conference system; and (c) if the RTP element is subscribed to the dynamic multicast that the new multimedia terminal wants to join according to a result of the confirmation in the step (a), causing the new multimedia terminal to join the dynamic multicast tree of the multimedia conference system.

5 Claims, 8 Drawing Sheets

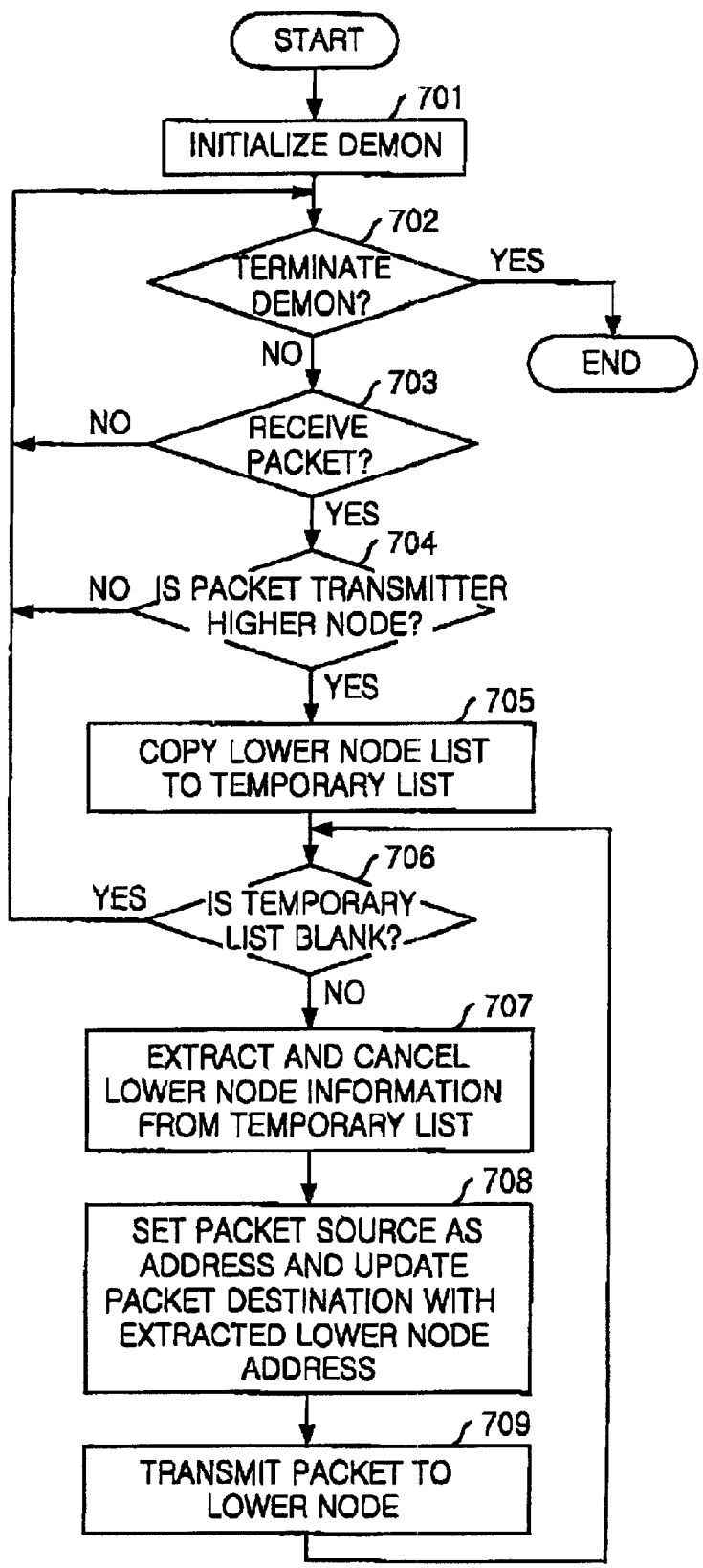

METHOD FOR SELECTING RTP ELEMENT IN DYNAMIC MULTICAST TREE FOR MULTIMEDIA CONFERENCE

FIELD OF THE INVENTION

The invention relates to a method of selecting a RTP (Real Time Protocol) element in a dynamic multicast tree for a multimedia conference and a record medium recorded with a program for realizing the method that can be read by computers; and, in more particular to a method of selecting a RTP element in a dynamic multicast tree for distributing an overload applied to the root node of the dynamic multicast tree when terminals which are not connected to a dynamic multicast network want to join a grand conference, and a record medium recorded with a program for realizing the method that can be read by computers.

DESCRIPTION OF THE PRIOR ART

A multimedia conference is composed of small-sized core conference participants and grand conference participants.

The small-sized core conference participants join the conference according to a multimedia conference setup procedure via a packet network, and other participants receive video and voice signals of the small-sized core conference participants.

The grand conference participants join and exit from the conference at any time. In a current method, a multi-point controller (MC) multicasts a media stream to terminals, and the participants receive the media stream of the multimedia conference by means of a multicasting. Also, the terminals which are not connected to the multicast network can join the conference by using the muticast network such as a current multicast backBONE (MBONE) or by using a dynamic multicast tree.

However, there has been a problem that the root node is overloaded if the dynamic multicast tree is used and a number of new conference participants send messages for joining the conference to the root node at the beginning of a new conference.

SUMMARY OF THE INVENTION

Therefore, it is an object of the invention to provide a method of selecting a RTP element in a dynamic multicast tree for distributing an overload applied to the root node of the dynamic multicast tree and a record medium recorded with a program for realizing the method that can be read by a computer.

In accordance with an aspect of the present invention, there is provided a method of selecting a RTP element in a dynamic multicast tree applied to a RTP element system, the method comprising the steps of: (a) confirming in the RTP element if the RTP element is subscribed to the dynamic multicast tree that a new multimedia terminal wants to join; (b) if the RTP element is not subscribed to the dynamic multicast that the new multimedia terminal wants to join according to a result of the confirmation in the step (a), joining in the RTP element the root node of the dynamic multicast tree and then causing the new multimedia terminal to join the dynamic multicast tree of a multimedia conference system; and (c) if the RTP element is subscribed to the dynamic multicast that the new multimedia terminal wants to join according to a result of the confirmation in the step (a), causing the new multimedia terminal to join the dynamic multicast tree of the multimedia conference system.

In accordance with another aspect of the present invention, there is provided a record medium recorded with a program that can be read by a computer for realizing, in a RTP element system having a mass processor, the following functions of: (a) confirming in the RTP element if the RTP element is subscribed to the dynamic multicast tree that a new multimedia terminal wants to join; (b) if the RTP element is not subscribed to the dynamic multicast that the new multimedia terminal wants to join according to a result of the confirmation in the step (a), joining in the RTP element the root node of the dynamic multicast tree and then causing the new multimedia terminal to join the dynamic multicast tree of a multimedia conference system; and (c) if the RTP element is subscribed to the dynamic multicast that the new multimedia terminal wants to join according to a result of the confirmation in the step (a), causing the new multimedia terminal to join the dynamic multicast tree of the multimedia conference system.

BRIEF DESCRIPTION OF THE DRAWINGS

The above and other objects and features of the instant invention will become apparent from the following description of preferred embodiments taken in conjunction with the accompanying drawings, in which:

FIG. 7 is a flow chart for showing a procedure in which a RTP receiver node joins as a node of a dynamic multicast tree to transmit a packet for a multimedia conference according to a further embodiment of the invention.

DETAILED DESCRIPTION OF THE PREFERRED EMBODIMENT

Hereinafter, embodiments of the invention will be described in detail in reference to the appended drawings.

Figure 1:
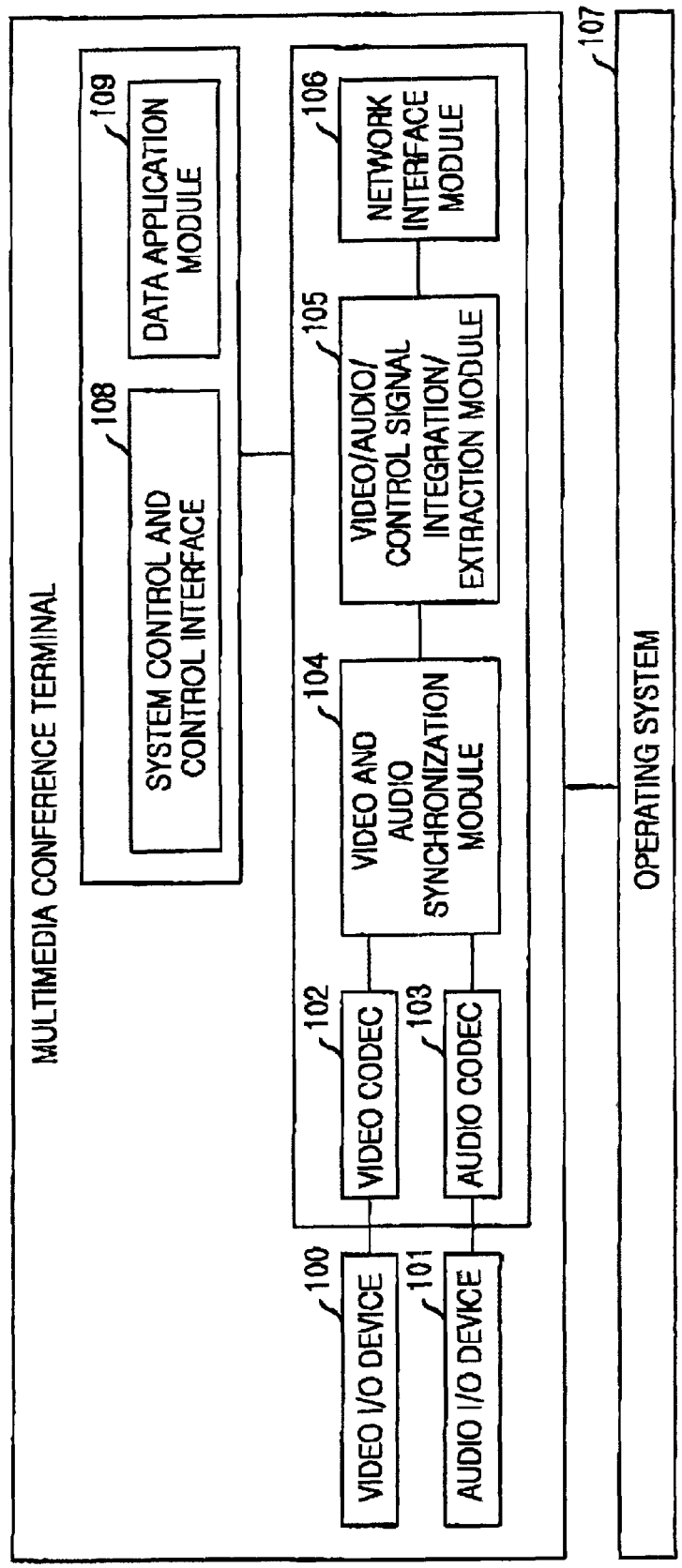
FIG. 1 is a structural view for showing an example of a multimedia conference terminal applied to the invention.

FIG. 1 is a structural view for showing an example of a multimedia conference terminal applied to the invention.

As shown in FIG. 1, the multimedia conference terminal of the invention operates in the environment of any operating system 107 such as Widows 95, 98 or NT, etc. which supports the internet, and has a video I/O (Input/Output) device 100, an audio I/O device 101, a video CODEC 102, an audio CODEC 103, a video and audio synchronization module 104, a video/audio/control signal integration and extraction module 105 and a network interface module or card 106 as hardwares, and a system control and control interface module 108 and a data application module 109 as softwares.

First, the video I/O device 100 receives image signals to produce video signals or replays received video signals, the audio I/O device 101 receives voice signals of a user to produce audio signals or replays received audio signals. The video CODEC 102 and the audio CODEC 103 compress the signals from the video and audio I/O devices 100 and 101 or restore the received signals.

The video/audio synchronization module 104 compensates the difference between the restoring times of the video and audio signals. the video/audio/control signal integration and extraction module 105 has functions of converting video/audio/control signals into signals for transmission and extracting video/audio/control signals from transmitted signals.

The network interface card 106 transmits the signals to a network or receives signals from the network.

Meanwhile, it is required that the multimedia conference terminal can interpret information about lower dynamic multicast trees for joining the dynamic multicast network and conform if a directly connected lower terminal is connected to the dynamic multicast network. When it is desired to release the connection with the dynamic multicast network, the multimedia conference terminal reports termination thereof to a directly connected higher terminal. Also, it is required for the multimedia conference terminal to propagate the transmitted packet to a lower directory.

Figure 2:
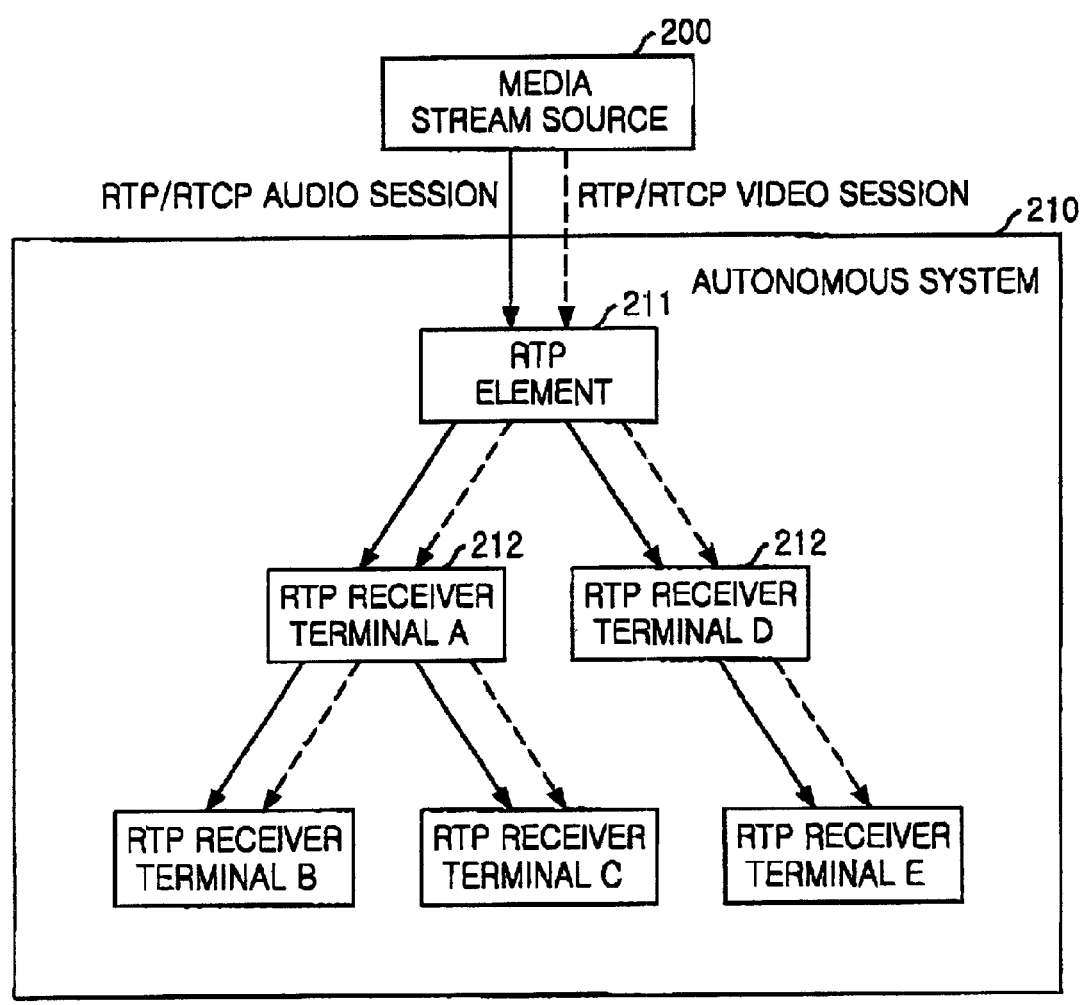
FIG. 2 is a structural view for showing an example of an autonomous system which is a basic unit of the dynamic multicast network applied to the invention.

FIG. 2 is a structural view for showing an example of an autonomous system which is a basic unit of the dynamic multicast network applied to the invention.

As shown in FIG. 2, the autonomous system 210 (hereinafter will be referred to as AS) has a RTP element 211 and RTP receiver terminals 212.

The RTP element 211 manages the AS 210 and communicates with other elements.

The RTP element 211 is connected to a media stream source as the root of the AS 210 so that the RTP element 211 can receive a media stream 200. It is also required that the RTP element 211 can construct the dynamic multicast network, and has ability to propagate to a lower tree, which has the RTP element 211 as the root about tree information or tree-info.

The tree information has a new parent IP address about each of the RTP receiver terminals 212. The RTP receiver terminals 212 transmit the multicast packet to other lower trees in order to effectively transmit information to RTP receiver terminals which are not connected to the multicast network.

A RTP receiver terminal B is called "lower terminal" of RTP receiver terminal A, and the RTP receiver terminal A is called "higher terminal" of RTP receiver terminal B. The RTP receiver terminal B and another RTP receiver terminal C are called "neighbor."

A higher terminal transmits RTP/RTCP audio and video sessions to a lower terminal.

Here, the RTP or real time protocol is a kind of application protocol for transmitting multimedia data which have real time property in a multimedia application. Also, the RTP can use other network transmission protocols as lower protocol. In other words, when the lower protocol provides multicast distribution, data can be transmitted to a number of destinations.

Also, the RTCP or real time control protocol is a protocol for controlling the RTP.

Figure 3:
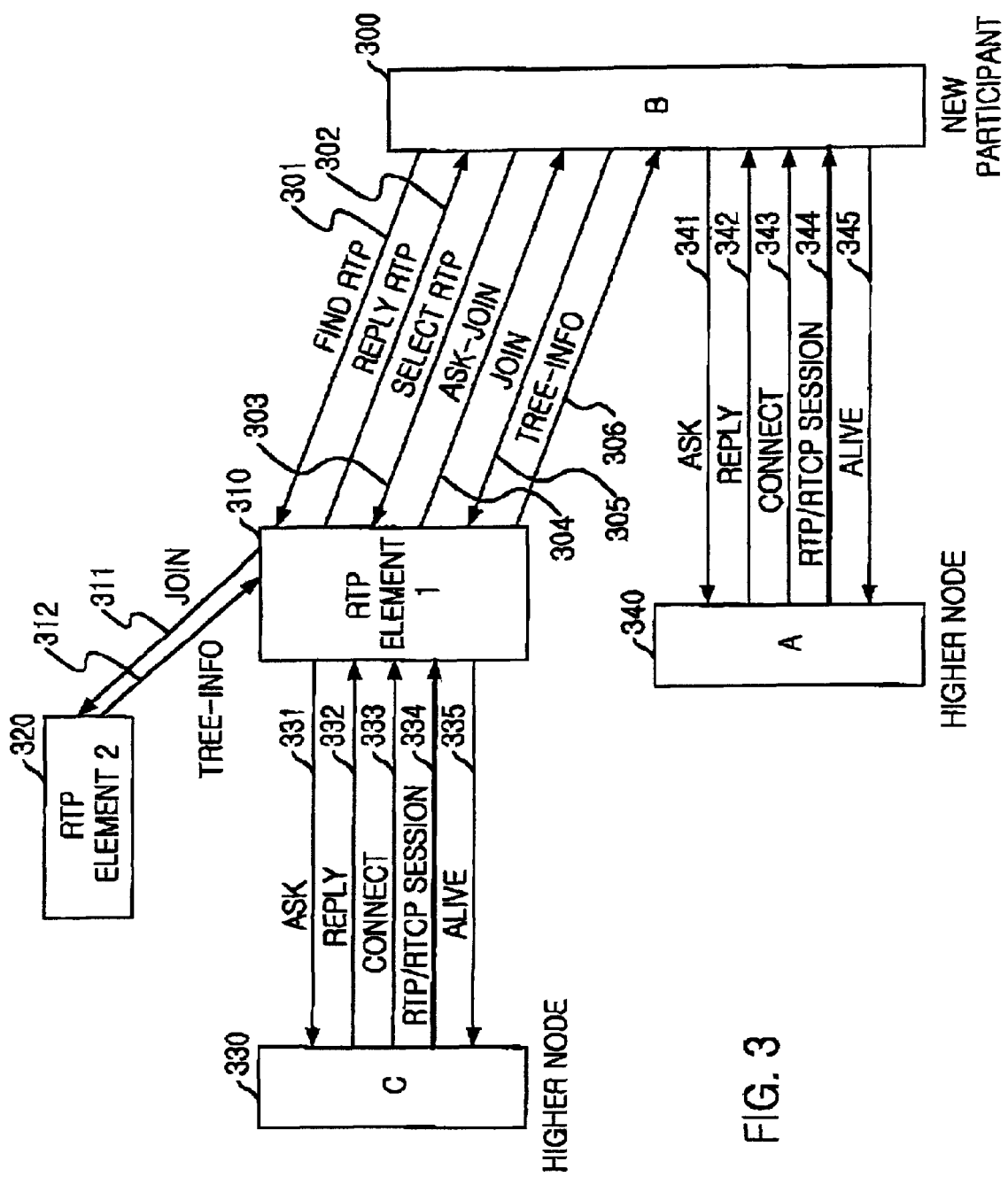
FIG. 3 shows signal flows in an example of a procedure for dynamic multicast tree joining of the new multimedia terminal according to the invention.

FIG. 3 shows signal flows in an example of a procedure for dynamic multicast tree joining of the new multimedia terminal according to the invention, in which messages are transmitted to construct the dynamic multimedia tree in the multimedia conference service while distributing the load of the root node.

As shown in FIG. 3, the messages are transmitted to construct the dynamic multimedia tree in the multimedia conference service while distributing the load of the root node as follows:

First, a new participant B or 300 sends a find RTP message 301 to find a RTP element for joining the nearest dynamic multicast tree.

The find RTP message 301 includes IP address of the new participant and IP address information of the RTP element which is the root node of the dynamic multicast tree to which the IP address is notified.

Upon receiving the find RTP message 301, first RTP element 310 transmits a reply RTP message 302 to the new participant B or 300. Upon receiving the reply RTP message 302, the new participant B or 300 waits for a predetermined time period, and then selects a suitable RTP element and transmits a select RTP message 303 to the RTP element. Here, it is confirmed if the first RTP element 310 is subscribed in the dynamic multicast tree that the participant B or 300 wants to join.

If the first RTP element 310 is subscribed in the dynamic multicast tree that the participant B or 300 wants to join as a result of the confirmation, a message asking to join or ask-join message 304 is transmitted to the new participant B or 300.

If the first RTP element 310 is not subscribed in the dynamic multicast tree that the participant B or 300 wants to join as a result of the confirmation, a join message 311 is transmitted to second RTP element 320 that is the root node of the dynamic multicast tree. Here, the join message 311 includes information that indicates ability of the first RTP element 310.

Upon receiving the join message 311 from the first RTP element 310, the second RTP element 320 constructs a dynamic multicast tree and transmits a tree-info message 312 to the first RTP element 310. The tree-info message 312 includes IP address about a higher node of the first RTP element 310.

Upon receiving the tree-info message 312, the first RTP element 310 uses information included in the message to set IP addresses of the higher node and the RTP element.

The first RTP element 310 transmits an ask message 331 to the IP address of the newly set higher node C or 330. The ask message 331 includes the IP address and ability of the first RTP element.

Upon receiving the ask message 331 from the first RTP element 310, the higher node C or 330 adds the IP address of the first RTP element 310 to a lower terminal list. The first RTP element 310 receives a reply message 332 and a connect message 333 and then receives a RTP/RTCP session 334, and periodically transmits an alive message 335 to the higher node C or 330 to report the connection of the first RTP element 310 to the higher node C or 330. The higher node C or 330 cancels the first RTP element 310 from the lower terminal list if the alive message 335 is not received for a predetermined time period. Also, the higher node stops packet transmission and closes the RTP/RTCP session 334 if the alive message 335 is not received from the lower node.

Upon receiving the connect message 333, the first RTP element 310 transmits the ask-join message 304 to the participant B or 300.

When the message is received from one of the cases including that the first RTP element 310 is subscribed in the dynamic multicast tree that the participant B or 300 wants to join and that the first RTP element 310 is subscribed in the dynamic multicast tree that the participant B or 300 wants to join, the participant B or 300 transmits the join message 305 to the first element 310. The join message 305 includes information indicating ability of B or 300.

When the first RTP element 310 receives the join message 305, the first RTP element 310 constructs the dynamic multicast tree and transmits the tree-info message 306 to the RTP receiver terminal B or 300.

The tree-info message 306 includes the IP address about the higher node of the terminal B or 300 and IP address of the RTP element that is the root of the AS to which the terminal B or 300 will belong when the RTP element is not changed, and address of new RTP element when the RTP element is changed. If the IP address of the RTP element, which is the root of the AS to which the terminal B or 300 will belong, is same as the IP address of the terminal B, the terminal B or 300 itself the root of the new AS and also the higher terminal is the RTP element that is the root of another AS.

If the tree-info message 305 includes new RTP address, the join message is transmitted to the new RTP element, and the RTP receiver terminal B or 300 which received the tree-info message 305 uses the information included in the message to set the IP addresses of the higher terminal and the RTP element.

The RTP receiver terminal B or 300 transmits an ask message 341 to an IP address of a higher node A or 340 which is newly set.

The ask message 341 includes the IP address and ability of the terminal B or 300.

Upon receiving the ask message 341, the higher node A or 340 adds the IP address of the RTP receiver terminal B or 300 to a lower terminal list and transmits a reply message 342 to the receiver terminal B or 300.

Upon receiving the reply message 343 and a connect message 343, the receiver terminal B or 300 receives a RTP/RTCP session 344, and periodically transmits an alive message 345 to the higher node A or 340 to report the connection of the receiver terminal B or 300 to the higher node A or 340.

The higher node A or 340 cancels the receiver terminal B or 300 from the lower terminal list if it does not receive the alive message 345 for a predetermined time period. Also, the RTP receiver terminal stops the packet transmission and closes the RTP/RTCP session 344 if the alive 345 message is not received from the lower terminal.

When the new RTP receiver terminal joins the conference, the receiver terminal transmits the join message to the RTP element that the address thereof is previously known, so as to report that the RTP receiver terminal will join the conference. When leaving the conference, the conference participant transmits a leave message to the RTP element of the AS to which the conference participant belongs. Also, the RTP element reconstructs the dynamic multicast network about the lower multicast network having the leaving RTP receiver terminal as the root and connects to the nearest node, and then transmits a new dynamic multicast tree-info to the previously notified RTP element.

Number of the lower terminals connected to the RTP receiver terminal differs according to the network environment and node ability. The ability of the node for constructing the tree is used when the RTP element constructs the dynamic multicast network. The dynamic multicast tree is modified if the RTP receiver terminal joins or leaves the conference.

Figure 4:
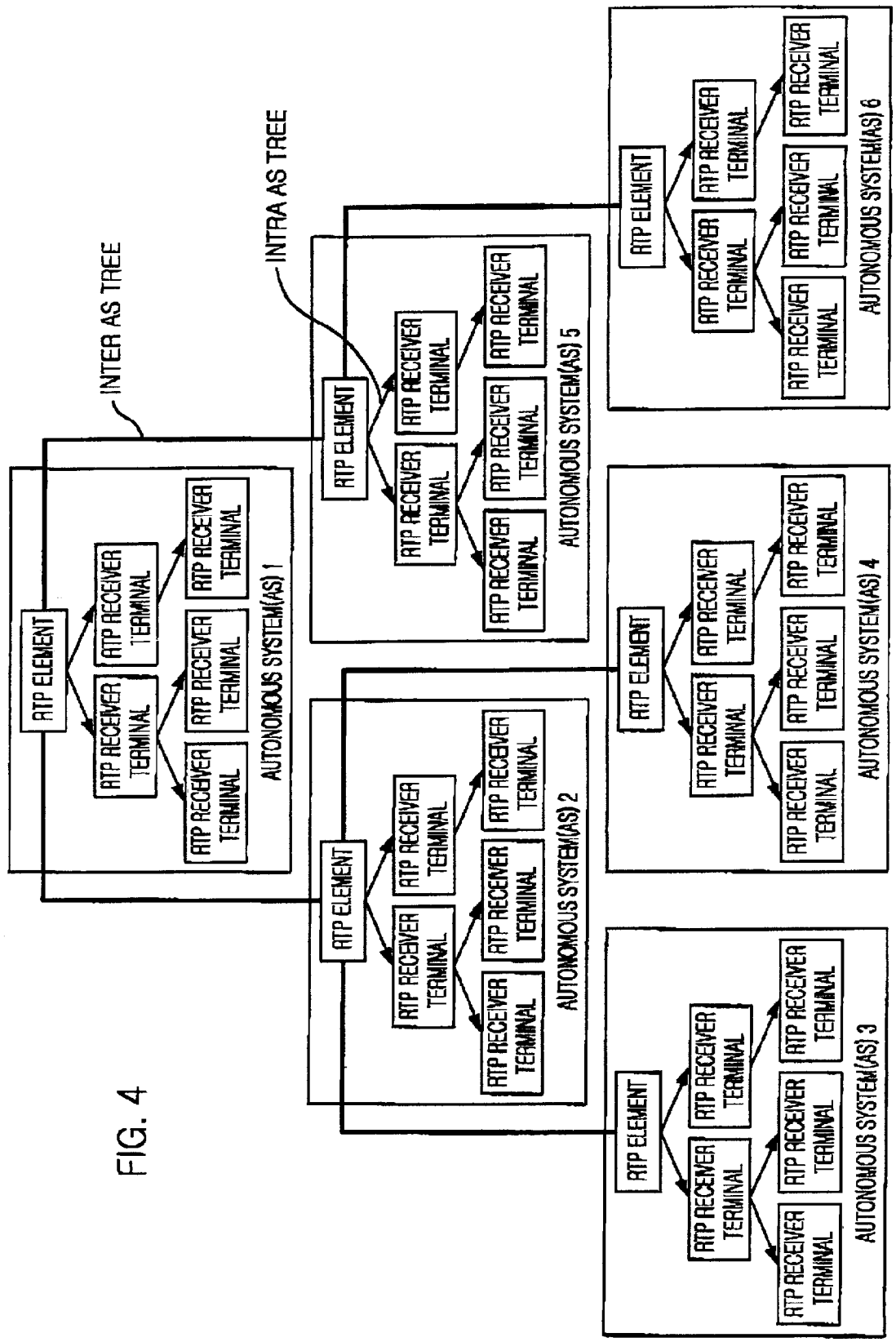
FIG. 4 is a structural view for showing an example of the overall dynamic multicast tree for a multimedia conference applied to the invention.

FIG. 4 is a structural view for showing an example of the overall dynamic multicast tree for a multimedia conference applied to the invention.

FIG. 4 is an example in which the ASs 210 are connected in a step configuration to construct the dynamic multicast network. The dynamic multicast tree is comprised of two kinds of trees, i.e., inter AS tree and intra AS tree.

The root of the inter AS tree is the RTP element 211 that directly receives multimedia conference contents from the media stream source 200, and connects the RTP elements in the shortest path. The previous multicast tree construction algorithm is used to construct the inter AS tree, and dynamically determined when a new participant is added to the dynamic multicast tree. Here, the RTP element to be connected to the media stream source is determined based upon number of hops among the media steam source 200 and the RTP element 211, band width, number of connected lower terminals, etc. Here, number of the hops means number of the RTP elements which are passed by from the media stream source 200 to the destination RTP element.

The root of the intra AS tree is the RTP element 211. In the inter AS tree, the RTP element 211 functions as a middle node between the RTP element 211 that is the root of the inter AS tree which directly receives the conference contents from the media stream source 200 and the root node of another AS.

The intra AS tree is connected to the RTP receiver terminal in the shortest path. It is required that the intra AS tree construction information is managed by the RTP element and transmitted to the RTP receiver terminal in the course of the conference setting.

Figure 5A:
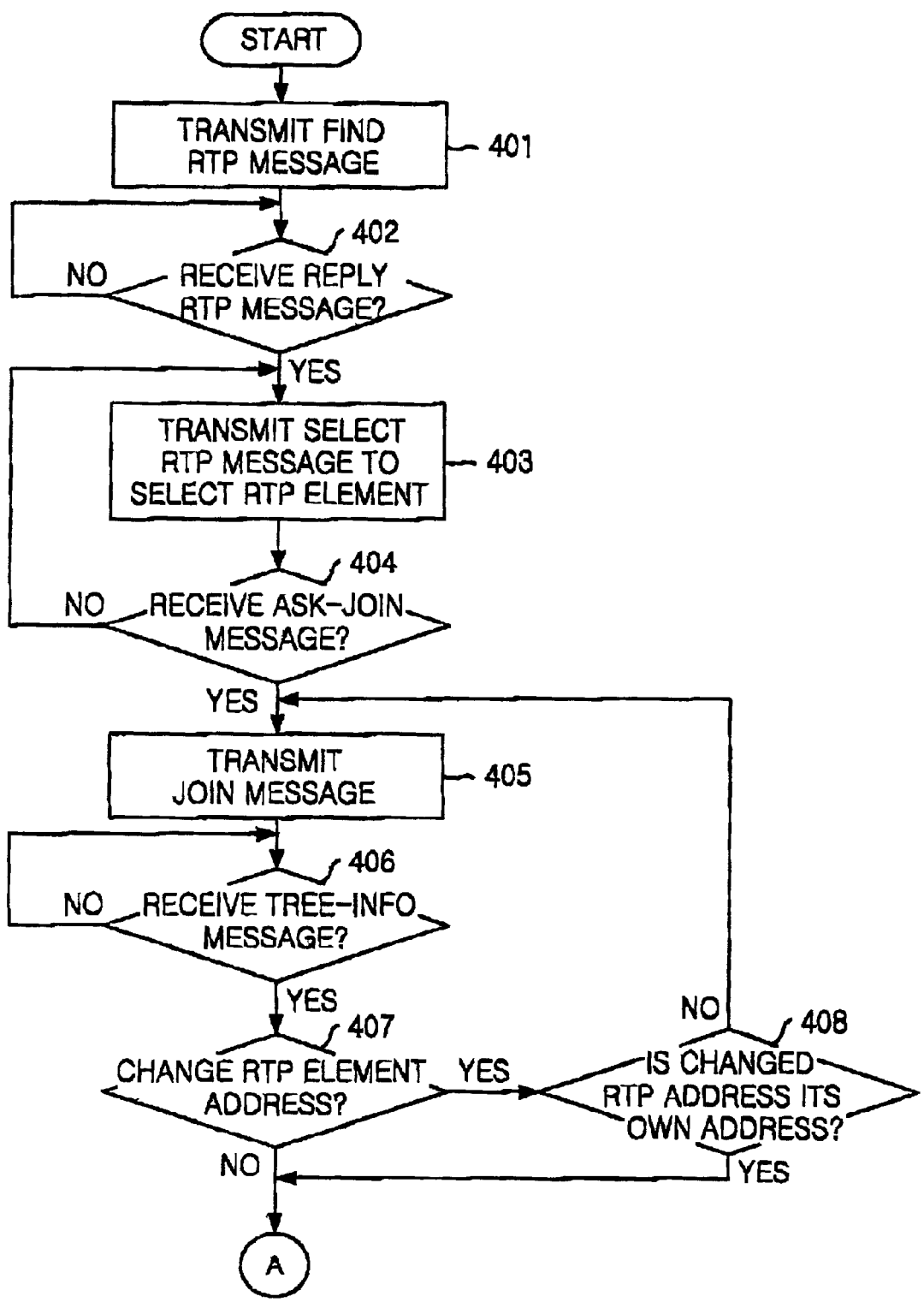
FIG. 5A and FIG. 5B are a flow chart for showing a procedure in which a new participant joins a dynamic multicast tree according to an embodiment of the invention.
Figure 5B:
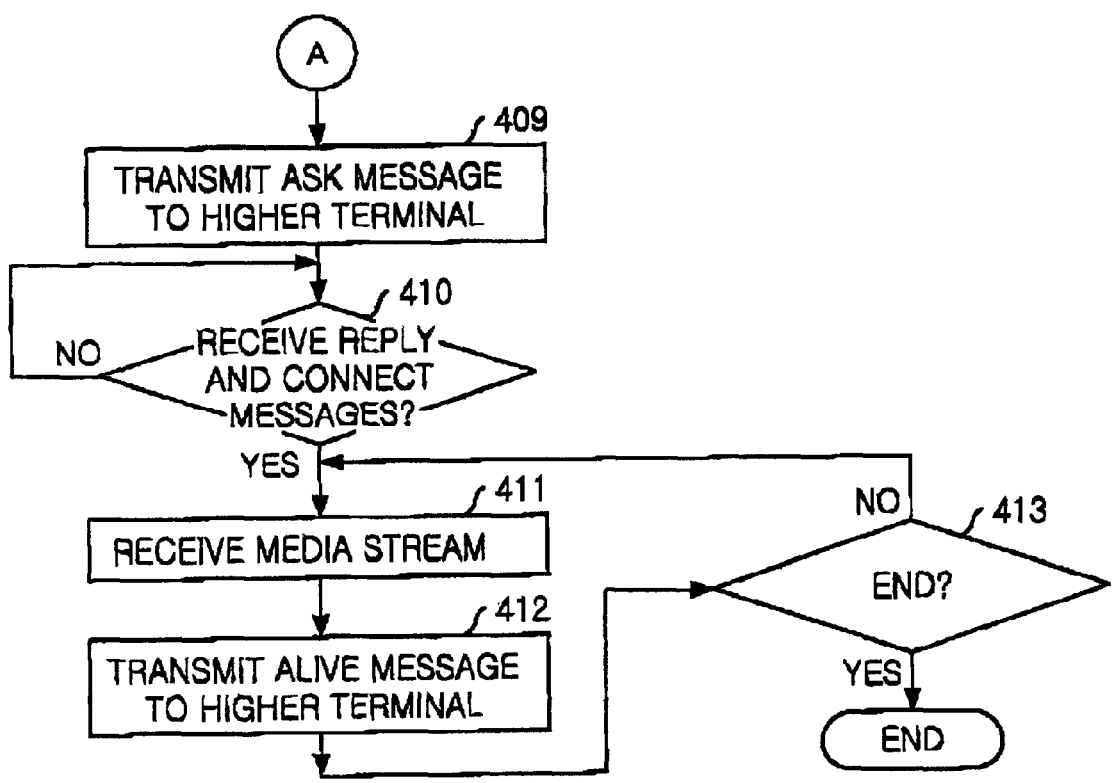

FIG. 5A and FIG. 5B are a flow chart for showing a procedure in which a new participant joins a dynamic multicast tree according to an embodiment of the invention.

In the procedure of joining the dynamic multicast tree, the new participant transmits a find RTP message to find a RTP element which can join a dynamic multicast tree nearest to the new participant in step 401.

In step 402, upon receiving the find RTP message, the RTP element transmits a reply RTP message, and the new participant confirms if the reply RTP message is received. If the reply RTP message is not received, the new participant waits to receive the message again. Upon receiving the reply RTP message, the new participant waits for a predetermined time period, and then selects a suitable RTP element and transmits a select RTP message to the RTP element in step 403, and then waits to receive an ask-join message from the RTP element.

If the ask-join message is received as a result of judgment in step 404, the new participant transmits a join message to the RTP element in step 405. If the ask-join message is not received, the new participant waits for the ask-join message again.

After the reply RTP message and ask-join message are received and the join message is transmitted to the RTP element, if the new participant receives a tree-info message in step 406, the new participant confirms if the address of the RTP element is changed from the previously known address to another one in step 407.

If the address of the RTP element is changed as a result of the confirmation of the address change, the new participant inspects if the changed address of the RTP element is that of the new participant in step 408.

If the changed address is not the address thereof as a result of the inspection, the new participant repeats to transmit the join message of joining with the address of the changed RTP element in the step 405.

If the changed address is the address thereof as a result of the inspection, the new participant transmits an ask message to a higher terminal to register the new participant in step 409. Here, the new participant itself is the RTP element so that the higher terminal becomes another RTP element.

If the address of the RTP element is not changed as a result of the confirmation, the new participant transmits the ask message to the higher terminal to register the new participant in the step 409.

In step 410, the multimedia terminal as a new participant receives a reply message and a connect message from the higher terminal. Then, the multimedia terminal or new participant belongs to the dynamic multicast tree for the multimedia conference.

In step 411, the multimedia terminal receives a media stream transmitted from the media stream source 200 via the multimedia conference, and in step 412, periodically transmits an alive message to the higher terminal to report aliveness thereof.

In step 413, it is determined to end or not. If selected not to end, the media stream is continuously received, and if selected to end, the foregoing procedure is terminated.

Figure 6:
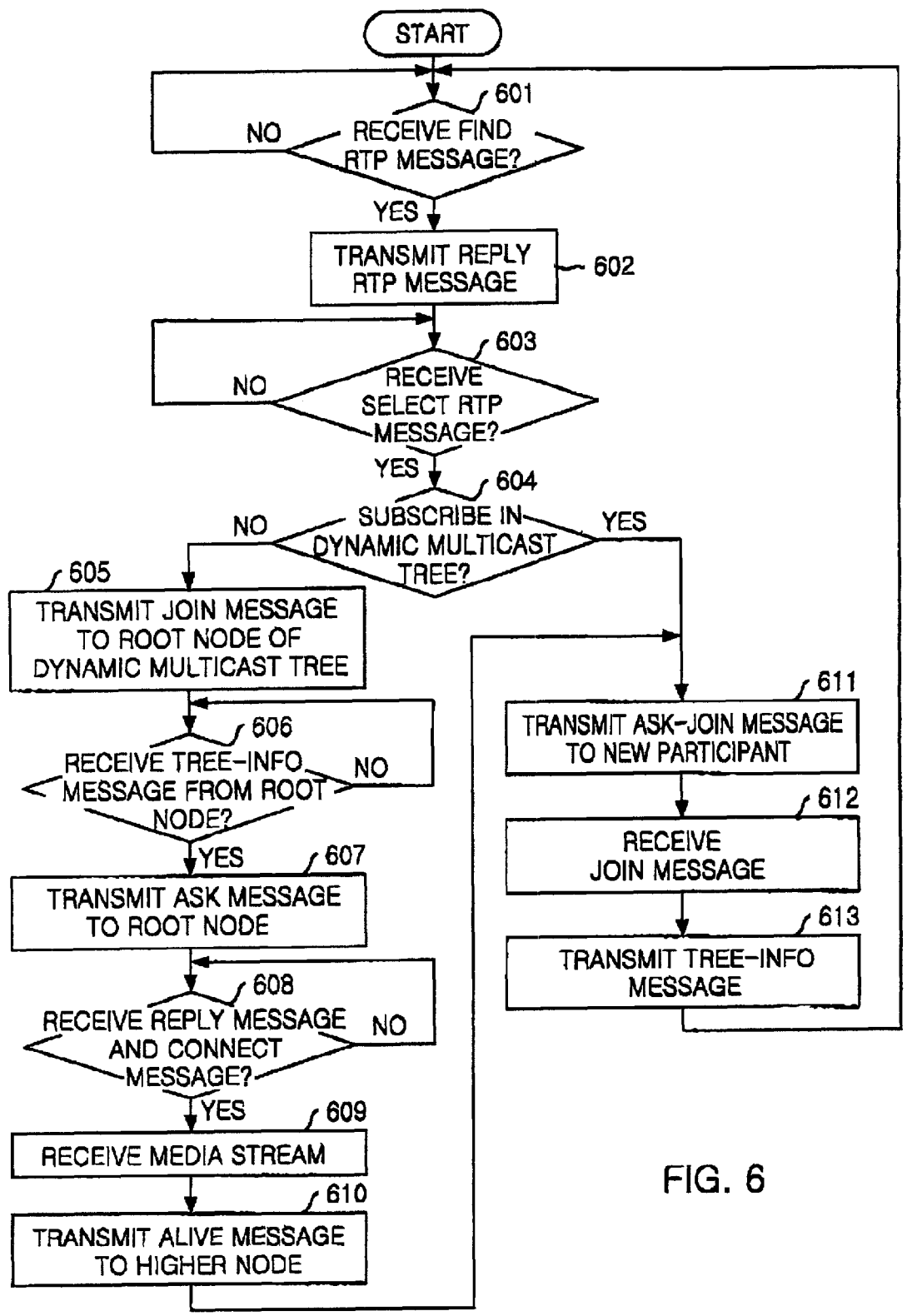
FIG. 6 is a flow chart for showing a procedure in which a new participant joins a dynamic multicast tree according to another embodiment of the invention.

FIG. 6 is a flow chart for showing a procedure in which a new participant joins a dynamic multicast tree according to another embodiment of the invention.

In the procedure of joining the dynamic multicast tree, it is determined if a find RTP message is received from the new participant in step 601, and then in step 601, a reply RTP message is transmitted to the new participant in the case of receiving the find RTP message.

After the RTP message is transmitted in the step 602, if a select RTP message is received from the new participant in step 603, it is determined if the RTP element itself is subscribed in the dynamic multicast that the new participant wants to join in step 604.

If the RTP element is subscribed in the dynamic multicast that the new participant wants to join as a result of the determination in the step 604, an ask-join message is transmitted to the new participant in step 611, and then a join message is received from the new participant in step 612. Also, after a tree-info message is transmitted, it is proceeded to the step 601 of receiving the find RTP message.

If the RTP element is not subscribed in the dynamic multicast that the new participant wants to join as a result of the determination in the step 604, a join message including information which indicates ability of the RTP element to the root node of the dynamic multicast tree in step 605, and it is determined if a tree-info message including IP address about a higher node of the RTP element is received from the root node in step 606. Here, upon receiving the tree-info message, the RTP element uses information included in the tree-info message to set the IP addresses of the higher node and the RTP element, and then transmits an ask message including the IP address and ability of the RTP element to the IP of the newly set higher node in step 607. After receiving the ask message, the root node adds the IP address of the RTP element to a lower terminal list and transmits a reply message and a connect message. The RTP element determines if the reply message and connect message from the root node are received in step 608. If the reply message and connect message are received, the RTP element receives a media stream in step 609, and periodically transmits an alive message to the higher node to report the connection thereof in step 610. Then, the ask-join message is transmitted to the new participant.

When the join message is received from the participant in step 612, after the tree-info message is transmitted, it is proceeded to the step 601 of receiving the find RTP message.

FIG. 7 is a flow chart for showing a procedure in which a RTP receiver node joins as a node of a dynamic multicast tree to transmit a packet for a multimedia conference according to a further embodiment of the invention.

Upon receiving the packet from a higher terminal, a RTP receiver terminal 212 and a RTP element 211 connected to the dynamic multicast tree transmits the packet to a higher terminal.

This is described according to the flow in FIG. 7 as follows:

First in step 701, the RTP terminals and RTP elements which are connected to the dynamic multicast tree initialize demonstration.

In step 702, it is confirmed if the initialized demonstration will be terminated. If selected not to terminate the demonstration, in step 703, it is confirmed if the packed is received.

When the packet is received, the RTP terminals and RTP elements confirm if the packet donor is received from the higher node thereof in step 704.

If the multimedia terminal joining the dynamic multicast tree as a node received the packet from the higher terminal, the multimedia terminal which received the packet copies a lower terminal list maintained thereby to a temporary list in step 705, and confirms if the temporary list is blank in step 706.

If the temporary list is not blank as a result of the confirmation in the step 706, address of the lower terminal is extracted from the temporary list and information about the lower terminal is canceled in step 707. About the packet received from the higher terminal, source of the packet is set as the address of the multimedia terminal, the destination of the packet is updated as the address of the extracted lower terminal in step 708, and the packet is transmitted to the lower terminal in step 709. Upon receiving the packet, the terminal repeats the step 706 of confirming if the temporary list is blank or not.

If the temporary list is not blank as a result of the confirmation in the step 706, it means that all of the packets received from the higher terminal is transmitted to the lower terminal or there is no lower terminal so that it is proceeded to the step 702 of confirming termination.

As described hereinbefore, the method of the invention can be stored in a record medium including CD-ROM, RAM, ROM, floppy disk, hard disk, optical magnetic disk, etc. as a form of a realizable program that can be read by a computer.

According to the invention, the method of constructing the multicast tree allows the terminals that are not connected to the multicast network to join the multimedia conference so that the expected overload to the root node can be distributed thereby efficiently constructing the grand conference.

Although the preferred embodiments of the invention have been disclosed for illustrative purpose, those skilled in the art will be appreciate that various modifications, additions and substitutions are possible, without departing from the scope and spirit of the invention as disclosed in the accompanying claims.

What is claimed is:

1. A method of selecting a RTP (Real Time Protocol) element in a dynamic multicast tree applied to a RTP element system, said method comprising the steps of:

a) confirming in the RTP element if the RTP element is subscribed to the dynamic multicast tree that a new multimedia terminal wants to join;

b) if the RTP element is not subscribed to the dynamic multicast that the new multimedia terminal wants to join according to a result of the confirmation in said step a) joining in the RTP element the root node of the dynamic multicast tree and then causing the new multimedia terminal to join the dynamic multicast tree of a multimedia conference system; and c) if the RTP element is subscribed to the dynamic multicast that the new multimedia terminal wants to join according to a result of the confirmation in said step a), causing the new multimedia terminal to join the dynamic multicast tree of the multimedia conference system.

2. The method of selecting a RTP (Real Time Protocol) element in a dynamic multicast tree as recited in claim 1, wherein said step a) of confirming includes the steps of:

a1) receiving in the RTP element a find RTP message from the new multimedia terminal that wants to join the dynamic multicast tree;

a2) sending from the RTP element a reply RTP message about the find RTP message to the new multimedia terminal; and a3) confirming in the RTP element if the RTP element is subscribed in the dynamic multicast tree that the new multimedia terminal wants to join.

3. The method of selecting a RTP (Real Time Protocol) element in a dynamic multicast tree as recited in claim 1, wherein said step b) of joining includes the steps of:

b1) sending a join message to the root node of the dynamic multicast tree and then receiving tree information from the root node;

b2) sending an ask message to second higher node and receiving reply and connect messages;

b3) receiving a media stream from the second higher node and sending an alive message to the second higher node; and b4) sending an ask-join message to the new multimedia terminal to join the multimedia terminal to the dynamic multicast tree.

4. The method of selecting a RTP (Real Time Protocol) element in a dynamic multicast tree as recited in claim 1, wherein said step c) of joining includes the steps of:

c1) sending an ask-join message to the new multimedia terminal and receiving a join message from the new multimedia terminal; and c2) causing the new multimedia terminal to join the dynamic multicast tree.

5. A computer readable record medium storing instructions for executing a method for selecting a RTP (Real Time Protocol) element in a dynamic multicast tree applied to a RTP element system, the method comprising the steps of:

a) confirming in the RTP element if the RTP element is subscribed to the dynamic multicast tree that a new multimedia terminal wants to join;

b) if the RTP element is not subscribed to the dynamic multicast that the new multimedia terminal wants to join according to a result of the confirmation in said step a), joining in the RTP element the root node of the dynamic multicast tree and then causing the new multimedia terminal to join the dynamic multicast tree of a multimedia conference system; and c) if the RTP element is subscribed to the dynamic multicast that the new multimedia terminal wants to join according to a result of the confirmation in said step a), causing the new multimedia terminal to join the dynamic multicast tree of the multimedia conference system.

* * * * *